(12) United States Patent
Sun et al.

(10) Patent No.: US 12,425,109 B1
(45) Date of Patent: Sep. 23, 2025

(54) PATTERNED HOUSING ELEMENT TO REDUCE INTERFERENCE

(71) Applicant: AMAZON TECHNOLOGIES, INC., Seattle, WA (US)

(72) Inventors: Ze Sun, Rolla, MO (US); Hariharan Muthukrishnan, Milpitas, CA (US); Jagan Vaidyanathan Rajagopalan, San Jose, CA (US); Chunyu Wu, Milpitas, CA (US); Khaled Ahmad Obeidat, San Jose, CA (US); Rohit Sammeta, Palo Alto, CA (US); Nathan Labadie, Hollister, CA (US); Akshay Mohan, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 445 days.

(21) Appl. No.: 18/057,090

(22) Filed: Nov. 18, 2022

(51) Int. Cl.
*H04B 15/00* (2006.01)
*H04B 1/40* (2015.01)

(52) U.S. Cl.
CPC .................... *H04B 15/00* (2013.01)

(58) Field of Classification Search
CPC .......... H04B 1/04; H04B 1/0475; H04B 1/06; H04B 1/10; H04B 1/1009; H04B 1/16; H04B 1/1607; H04B 1/18; H04B 1/38; H04B 1/40; H04B 15/00
See application file for complete search history.

(56) References Cited

U.S. PATENT DOCUMENTS

| 8,225,252 | B2* | 7/2012 | Alcocer Ochoa | H04B 15/00 324/750.01 |
| 10,431,872 | B1* | 10/2019 | Kim | H04B 1/401 |
| 11,096,072 | B2* | 8/2021 | Shen | H04B 17/318 |
| 11,695,217 | B2* | 7/2023 | Byun | H01Q 1/38 343/720 |

\* cited by examiner

*Primary Examiner* — Quochien B Vuong
(74) *Attorney, Agent, or Firm* — Lindauer Law, PLLC

(57) ABSTRACT

A wireless device may use two communication interfaces that utilize frequencies within the same band. As a result, a first communication interface such as an HDMI interface may interfere with operation of a second communication interface such as a WiFi interface. A conductive member is placed between the communication interfaces to reduce this interference. The conductive member has multiple slots, each slot having dimensions that cause resonance at a frequency used by the first communication interface. The number and spacing of the slots corresponds to the strength of signals used by the second communication interface. Placement of the conductive member between the first and second communication interfaces enables the conductive member to attenuate signals from the second communication interface that would interfere with the frequency used by the first communication interface.

20 Claims, 7 Drawing Sheets

PATTERNED HOUSING ELEMENT TO REDUCE INTERFERENCE

BACKGROUND

A device that uses two communication interfaces, such as Wi-Fi and High-Definition Multimedia Interface (HDMI) may be affected by interference if the communication interfaces utilize frequencies within the same band. Elements such as directional antennas and shielding may at least partially mitigate such interference, but increase the resources and cost associated with the device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
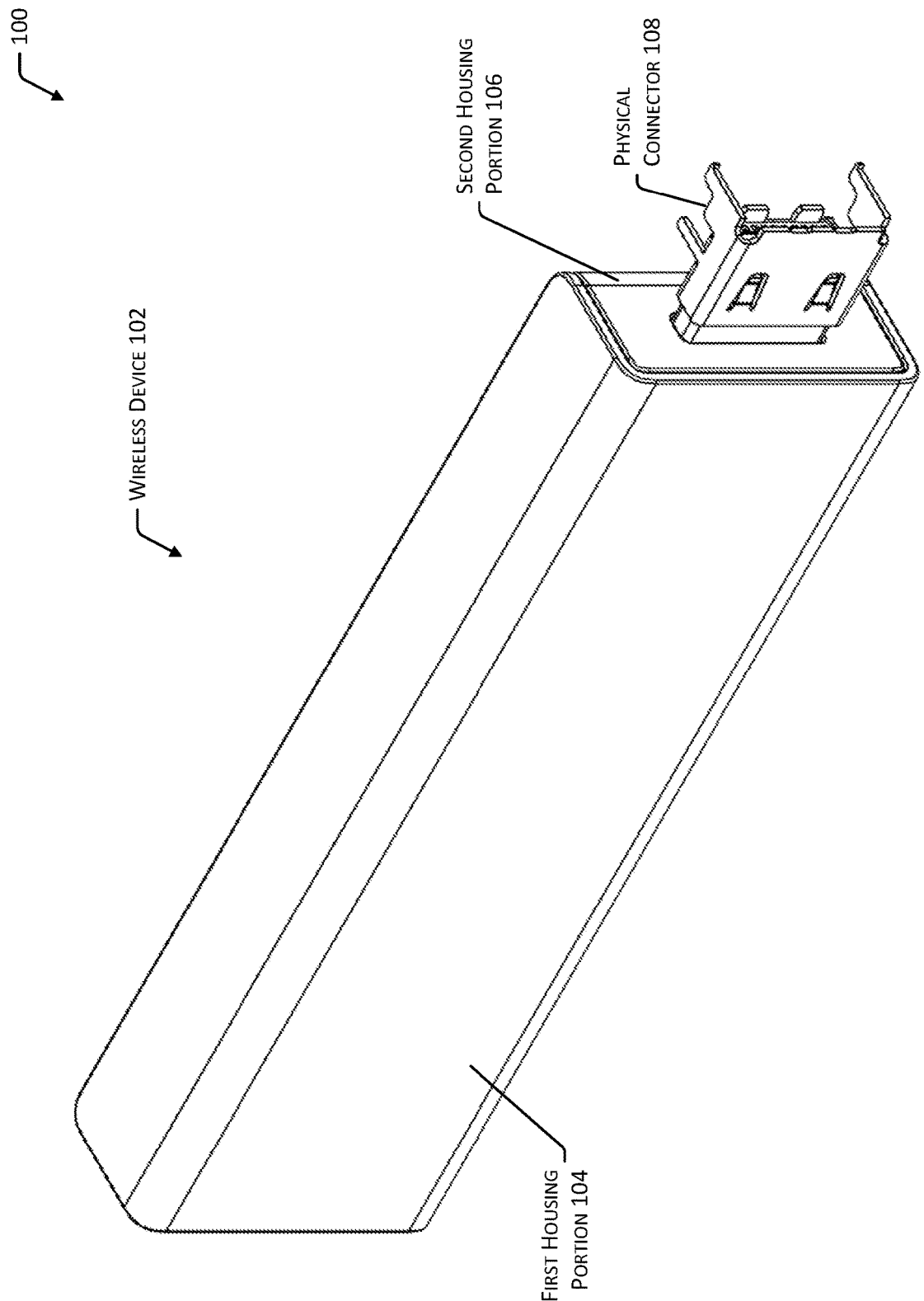
FIG. 1A is a diagram depicting an exterior view of an implementation of a wireless device having multiple communication interfaces and a conductive member to reduce interference to a first communication interface from a second communication interface.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many wireless devices, and other types of devices, utilize multiple communication interfaces. As one example, a wireless device that engages an HDMI port of a television may receive audio and video data via a wireless network using a Wi-Fi interface, while sending data to the television for output using an HDMI interface that engages the HDMI port of the television. In some cases, operation of one communication interface may interfere with communication using another communication interface. For example, a Wi-Fi interface may be susceptible to interference during operation of an HDMI interface if signals radiated by the HDMI interface are associated with the same frequency band used by the Wi-Fi interface, especially in cases where the two communication interfaces are physically proximate, such as when located in the same device housing. Interfering signals from the HDMI interface may significantly reduce the range and reliability of communication using a Wi-Fi interface. In some cases, a device may be provided with directional antennas, shielding, or other similar structures to improve noise immunity, reduce desense, and so forth. However, additional components incorporated into a device for this purpose may increase the time, cost, complexity, and resource utilization associated with manufacture of devices.

Described in this disclosure are techniques for reducing interference to a first communication interface within a device that is caused by operation of a second communication interface within the device. In one example implementation, a device may include a Wi-Fi interface and an HDMI interface, within a device housing and mounted to a circuit board that includes circuitry electrically coupled to both communication interfaces. For example, the Wi-Fi interface may be proximate to a first end of the circuit board, while the HDMI interface is proximate to a second end opposite the first end. Continuing the example, a physical HDMI connector may be positioned at or near the second end of the circuit board for engagement with an external device, such as a television. The Wi-Fi interface may operate within one or more frequency bands, such as a band that includes a frequency of 2.4 gigahertz (GHz). The HDMI interface, when operated, may radiate signals within a frequency band used by the Wi-Fi interface. As a result, signals radiated by the HDMI interface may interfere with communication using the Wi-Fi interface.

To reduce such interference, a conductive member, which may function as a waveguide structure, is positioned between the two communication interfaces. In one implementation, the conductive member may include copper tape, or another conductive material, adhered to an inner surface of the housing over portions of the circuit board proximate to the HDMI interface. The conductive member includes multiple slots, each slot having a length associated with resonance within the frequency band used by the Wi-Fi interface. Therefore, when the HDMI interface is operated, signals in the frequency band that are radiated from the HDMI interface are attenuated as they are conducted across the conductive member. The number of slots in the conductive member and the spacing between the slots may be selected based on the strength of the signals radiated from the HDMI interface. Placement of the conductive member between the communication interfaces to attenuate signals in this manner may significantly reduce the strength of interfering signals that reach the location of the Wi-Fi interface. Additionally, use of a conductive member that is relatively non-complex in construction or operation represents an efficient and non-costly alternative when compared to use of directional antennas, shielding, or other more resource-intensive techniques.

In some implementations, the conductive member may not be directly electrically coupled to the circuit board or to either communication interface. For example, the conductive member may not be within, or be a part of, a signal path associated with the output of signals from either of the communication interfaces. In some cases, a conductive foam may be placed between the conductive member and at least a portion of the circuit board, which may provide an electrical pathway between the conductive member and a system ground associated with the circuit board. In such a case, the conductive foam and conductive member may also function as a heat sink within the device.

In some implementations, the conductive member may have a three-sided shape. For example, a first side of the conductive member may be positioned between the circuit board and an inner surface of the housing. A second side of the conductive member may extend from one end of the first side toward the circuit board, such as along a side surface of the housing. A third side may extend from an opposite end of the first side toward the circuit board, such as along an opposite side surface of the housing. Each slot that is formed in the conductive member may extend through approximately one half of the width of the conductive member. For example, a slot may extend through a portion of the first side and one of the second side or the third side. In some cases, slots may be positioned opposite one another relative to a center of the conductive member. In other cases, the slots may have a staggered arrangement. In other implementations, the conductive member may have other shapes, such as a generally flat or planar shape, an angled or two-sided shape, a shape having more than three sides, and so forth.

The length of the slots may be selected to enable resonance of the conductive member for a frequency band used by one of the communication interfaces, such as a frequency band that includes a frequency of 2.4 GHz used by a Wi-Fi interface. In some implementations, slots of different lengths may be used, such as to enable resonance at multiple frequency bands. For example, a Wi-Fi interface may be capable of communication at frequencies of 2.4 GHz and 5 GHz. The number, shape, and width of the slots may affect the extent by which the conductive member attenuates signals from the other communication interface. For example, the number, spacing, width, and shape of the slots may be selected based on a signal strength associated with signals radiated by an HDMI interface. In some implementations, the slots may be rectangular in shape. In other implementations, the slots may have other shapes, such as trapezoidal shapes with a distal end that is wider than an end proximate to the center of the conductive member.

In some cases, the conductive member may be selectively positioned over portions of the circuit board that are associated with a particular communication interface. For example, the conductive member may be positioned proximate to an HDMI interface to more effectively attenuate signals radiated by the HDMI interface, while portions of the device adjacent to the Wi-Fi interface may include an open region into which the conductive member does not extend to prevent the conductive member from interfering with transmission or receipt of Wi-Fi signals using the Wi-Fi interface.

Implementations described herein therefore enable an efficient, low-cost, non-complex technique for reducing the effect of interfering signals on a first communication interface by a second communication interface in the same device. While implementations herein relate to devices that include a wireless communication interface, such as a Wi-Fi interface, and a communication interface that includes a wired connector or other type of physical connector, such as an HDMI interface, techniques described herein may be used in any device that uses multiple communication interfaces. Additionally, the techniques described herein to attenuate signals emitted by a communication interface may also be used to reduce interference to communications by different devices.

FIG. 1A is a diagram 100 depicting an exterior view of an implementation of a wireless device 102 having multiple communication interfaces, and a conductive member to reduce interference to a first communication interface caused by a second communication interface. The wireless device 102 is shown having an exterior housing that includes a first housing portion 104 engaged with a second housing portion 106 to enclose the communication interfaces, conductive member, circuitry, and other components within the housing. In other implementations, the housing may include a single piece, or more than two pieces. FIG. 1A depicts each housing portion having a three-sided shape in which two sides extend generally perpendicular to a third side, such that engagement of the two housing portions provides the wireless device 102 with a generally rectangular shape. However, in other implementations, wireless devices 102 and housings having any shape capable of at least partially enclosing the communication interfaces and circuitry may be used.

In some implementations, at least one of the communication interfaces may include a physical connector 108. For example, an HDMI interface may include a wired connector or other type of physical connector 108 that engages the communication interface within the housing, and extends through an opening in the housing to enable engagement between the physical connector 108 and another device, such as a television. In other implementations, other types of physical connectors 108 may be used. In still other implementations, the wireless device 102 may use multiple wireless communication interfaces and use of a physical connector 108 may be omitted. In still other implementations, the wireless device 102 may include multiple communication interfaces that include physical connectors 108, or a single communication interface may include multiple physical connectors 108, in which case the wireless device 102 may include multiple physical connectors 108 extending from the housing. Additionally, while FIG. 1A depicts an implementation of a wireless device 102 having two communication interfaces, in other implementations, devices with more than two communication interfaces may be used, or techniques described herein may be used to reduce interference in a device having a single communication interface caused by communication using another device.

Figure 1B:
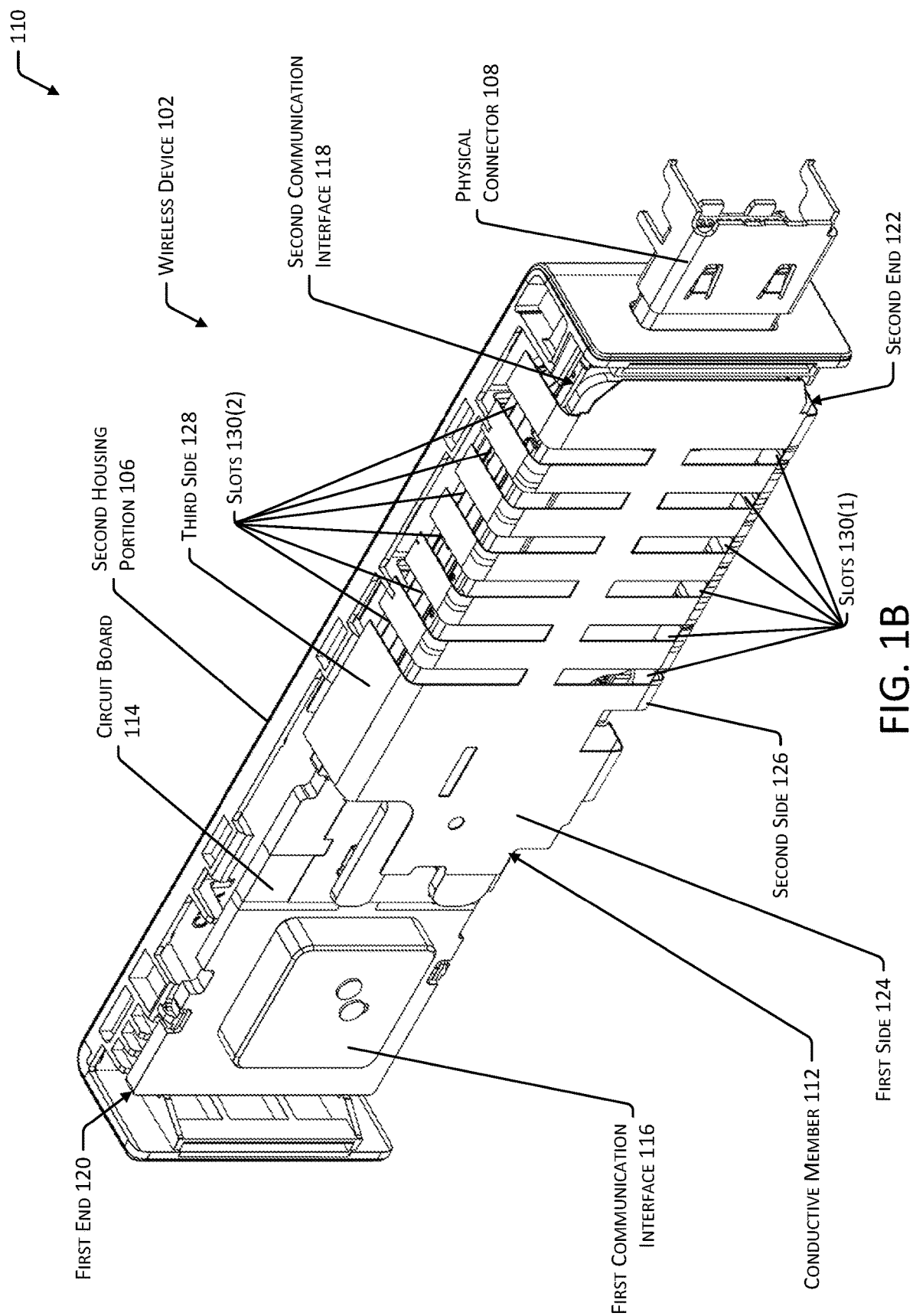
FIG. 1B is a diagram depicting the wireless device of FIG. 1A with a portion of the housing removed to illustrate the communication interfaces and conductive member within the housing.

FIG. 1B is a diagram 110 depicting the wireless device 102 of FIG. 1A with a portion of the housing removed to illustrate the communication interfaces and conductive member 112 within the housing. Specifically, FIG. 1B depicts the wireless device 102 with the first housing portion 104 removed. A circuit board 114 within the housing may include electrical circuitry that engages a first communication interface 116 and a second communication interface 118, as well as other components of the wireless device 102, such as processors, clocks, memory, other communication interfaces, input devices such as buttons or switches, output devices such as lights, and so forth. The first communication interface 116 is shown positioned at a first end 120 of the circuit board 114, while the second communication interface 118 is shown positioned at a second end 122 of the circuit board 114 opposite the first end 120.

As described previously, the first communication interface 116 may include a wireless communication interface, such as a Wi-Fi interface having one or more transceivers that send and receive signals using one or more wireless networks. The Wi-Fi interface may utilize one or more frequency bands, such as a frequency band that includes a frequency of 2.4 GHz. The second communication interface 118 may include an HDMI interface or other type of interface that may include a physical connector 108 that extends through an opening in the housing to engage an adjacent device. Operation of the second communication interface 118 may cause signals from the second communication interface 118 that are associated with the frequency band used by the first communication interface 116 to radiate from the second communication interface 118, which may interfere with communication using the first communication interface 116.

To reduce interference to the first communication interface 116 caused by signals associated with the second communication interface 118, a conductive member 112 may be positioned between the first communication interface 116 and the second communication interface 118. As shown in FIG. 1B, the conductive member 112 may be positioned closer to the second end 122 of the circuit board 114 than the first end 120, such that the conductive member 112 is positioned over at least a portion of the second communication interface 118, and is not positioned over the portion of the circuit board 114 that includes the first communication interface 116. Placement of the conductive member 112 at a position that does not significantly cover or occlude the first communication interface 116 may prevent the conductive member 112 from interfering with transmission or receipt of signals by the first communication interface 116.

In some implementations, the conductive member 112 may be positioned between a portion of the circuit board 114 that includes the second communication interface 118 and the first housing portion 104. For example, the conductive member 112 may be formed from copper tape or another type of conductive material that may be adhesively secured or otherwise engaged with the first housing portion 104. The conductive member 112 may have a three-sided shape in which a first side 124 is positioned on an inner surface of the first housing portion 104. A second side 126 of the conductive member 112 extends from a first end of the first side 124 toward the circuit board 114 (e.g., along a sidewall of the first housing portion 104), and a third side 128 of the conductive member 112 extends from a second end of the first side 124 toward the circuit board 114 (e.g., along an opposing sidewall of the first housing portion 104). The conductive member 112 may be disassociated from the signal pathways used by the first communication interface 116 or second communication interface 118. For example, the conductive member 112 may not be electrically coupled via a direct conductive path to either communication interface or to the circuit board 114, but may be positioned such that the electromagnetic field of the signals emitted by the second communication interface 118 are attenuated by the conductive member 112. In some implementations, a conductive foam between the conductive member 112 and the circuit board 114 may provide an electrical pathway between the conductive member 112 and a system ground of the circuit board 114, however in such a case, the conductive member 112 may remain disassociated from the signal pathways used by the communication interfaces.

When the second communication interface 118 is operated, signals emitted by the second communication interface 118 that are associated with the frequency band used by the first communication interface 116 may be attenuated as the signals pass through the conductive member 112. The conductive member 112 may include multiple slots 130, each slot 130 having a length selected to cause resonance of the conductive member 112 at the frequency band used by the first communication interface 116. For example, FIG. 1B depicts the conductive member 112 including a first plurality of slots 130(1) that extend through the second side 126 and a portion of the first side 124 of the conductive member 112, and a second plurality of slots 130(2) opposite the first plurality of slots 130(1) that extend through the third side 128 and a portion of the first side 124 of the conductive member 112. While the length of the slots 130 may cause resonance of the conductive member 112 at the frequency band used by the first communication interface 116, the number, width, and spacing of the slots 130 may be selected based on the strength of signals radiated by the second communication interface 118. For example, the number, width, and spacing of the slots 130 may affect the amount of interference from the second communication interface 118 that is attenuated by the conductive member 112.

As such, while FIG. 1B depicts the first plurality of slots 130(1) and the second plurality of slots 130(2) each including six slots, any number of slots 130 may be used, having any width or spacing. Additionally, while each slot of the first plurality of slots 130(1) is shown positioned at a location on the conductive member 112 opposite a respective slot of the second plurality of slots 130(2), in other implementations, the slots 130 may be positioned in a staggered arrangement, such that a slot extending through the second side 126 of the conductive member 112 is not positioned directly opposite a slot extending through the third side 128 of the conductive member 112. Additionally, while FIG. 1B depicts each of the slots 130 having a rectangular shape, in other implementations, the slots 130 may have other shapes, such as trapezoidal shapes in which a first end of a slot 130 is thicker than a second end thereof. Further, while FIG. 1B depicts each slot 130 having an identical length, in other implementations, slots 130 having different lengths may be used. For example, if the first communication interface 116 uses multiple frequencies, such as a Wi-Fi interface that uses both 2.4 GHz and 5 GHz frequencies, the lengths of the slots 130 may be selected to cause resonance of the conductive member 112 at multiple frequencies to enable signals from the second communication interface 118 associated with multiple frequencies to be attenuated by the conductive member 112.

Figure 2:
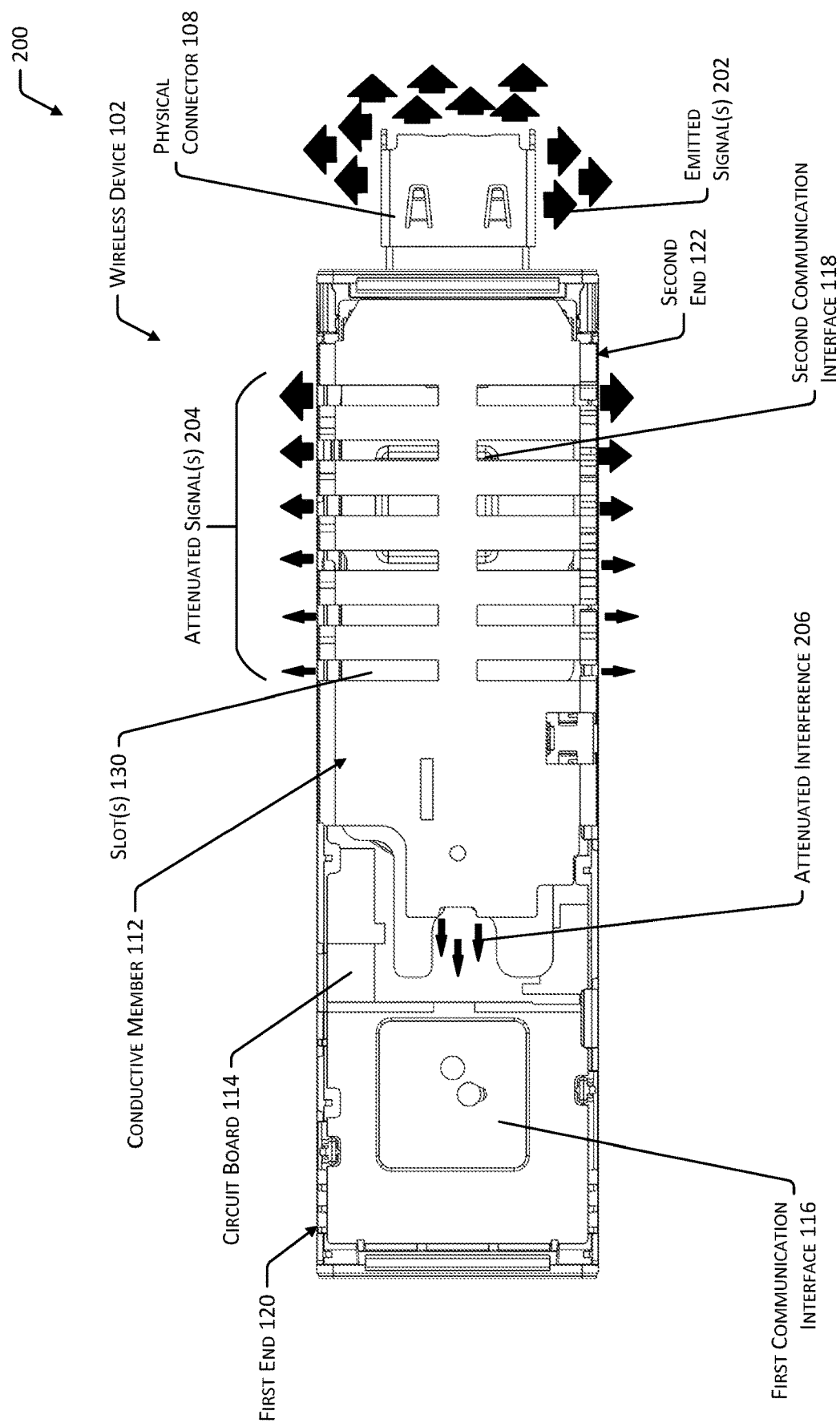
FIG. 2 is a diagram depicting the attenuation of signals by an implementation of a conductive member to prevent interference to a first communication interface from a second communication interface.

FIG. 2 is a diagram 200 depicting the attenuation of signals by an implementation of a conductive member 112 to prevent interference to a first communication interface 116 from a second communication interface 118. As described with regard to FIGS. 1A and 1B, a wireless device 102 may include a circuit board 114 within a housing. A first communication interface 116 may be mounted proximate to a first end 120 of the circuit board 114, while a second communication interface 118 is mounted proximate to a second end 122 of the circuit board 114.

As described previously, during operation of the second communication interface 118, emitted signals 202 may be radiated in one or more directions. In some cases, at least a portion of the emitted signals 202 may be associated with a frequency band used by the first communication interface 116. For example, the first communication interface 116 may include a Wi-Fi interface, and at least a portion of the emitted signals 202 may interfere with wireless communication using a 2.4 GHz frequency band used by the Wi-Fi interface.

The conductive member 112 positioned between the first communication interface 116 and the second communication interface 118 may at least partially attenuate the emitted signals 202 from the second communication interface 118 that are emitted toward the first communication interface 116 that may interfere with communication by the first communication interface 116. As described previously, the length of at least a portion of the slots 130 formed in the conductive member 112 may be selected to cause resonance of the conductive member 112 at the frequency used by the first communication interface 116. The number, width, and spacing of the slots 130 may be selected based on the strength of the emitted signals 202. For example, a larger number of slots 130 or a longer conductive member 112 may reduce the strength of the emitted signals 202 that reach the position of the first communication interface 116 more significantly than a conductive member 112 that is shorter or that includes fewer slots 130.

As illustrated in FIG. 2, as signals emitted by the second communication interface 118 pass through the conductive member 112, the attenuated signals 204 become weaker. For example, the signal strength of the attenuated signals 204 closer to the position of the first communication interface 116 may be less than the signal strength of the attenuated signals 204 closer to the position of the second communication interface 118. Signals from the second communication interface 118 that pass the position of the conductive member 112 and reach the position of the first communication interface 116 may function as attenuated interference 206. The strength of the attenuated interference 206 and the effect of the attenuated interference 206 on communication using the first communication interface 116 may be significantly less than the strength of the emitted signals 202 and the effect that the emitted signals 202 would cause on communication using the first communication interface 116 in the absence of the conductive member 112.

Figure 3A:
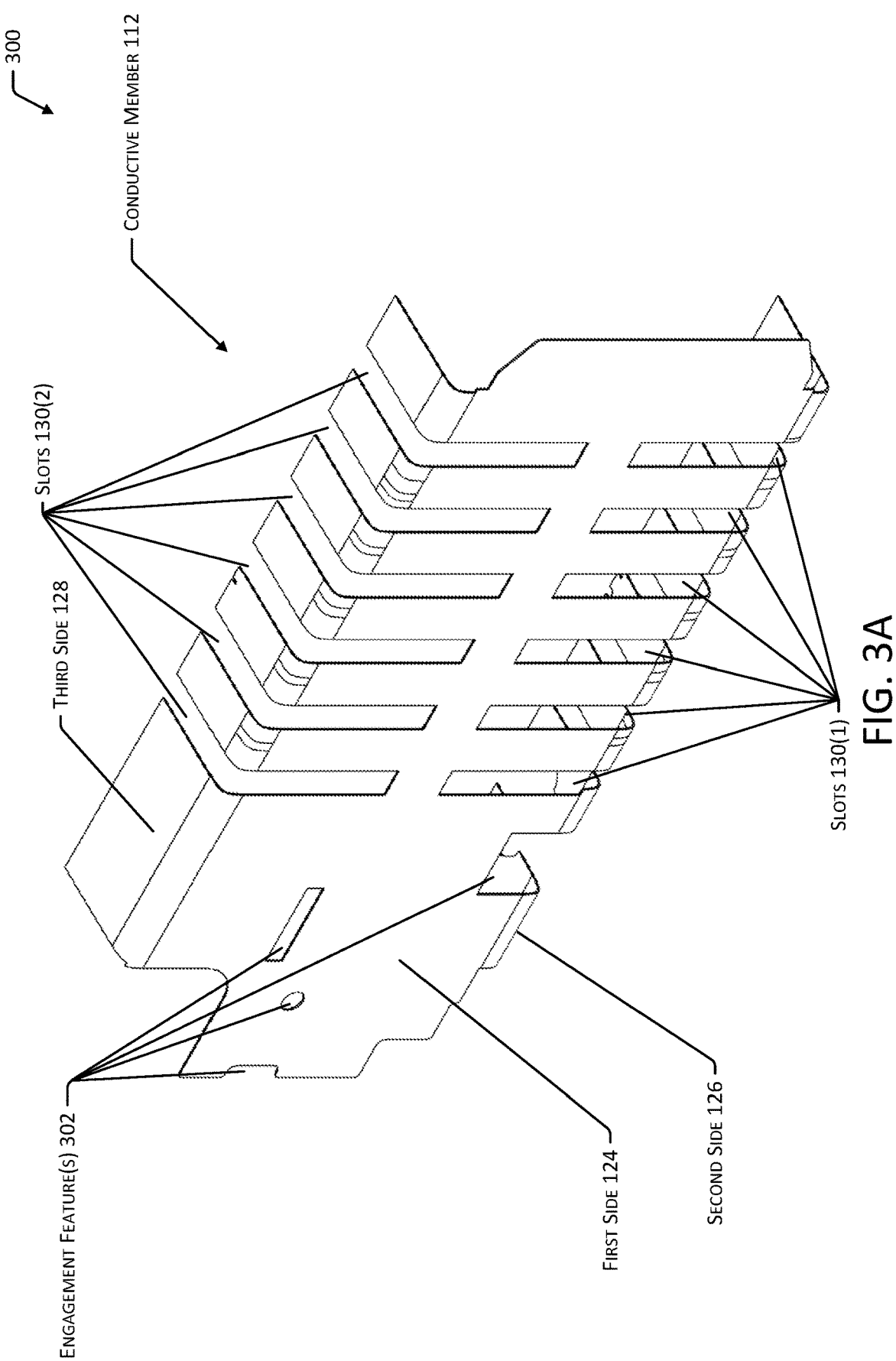
FIG. 3A is a diagram depicting a perspective view of an implementation of a conductive member to prevent interference to a first communication interface from a second communication interface.

FIG. 3A is a diagram 300 depicting a perspective view of an implementation of a conductive member 112 to prevent interference to a first communication interface 116 from a second communication interface 118. The conductive member 112 includes a first side 124. FIG. 3A depicts the first side 124 having a generally flat, planar configuration, such as for placement against a generally flat, planar interior surface of the housing of a wireless device 102. However, in other implementations, conductive members 112 having round or angled surfaces may be used. A second side 126 of the conductive member 112 extends from a first end of the first side 124 at an angle. While FIG. 3A depicts the angle at which the second side 126 extends from the first side 124 as generally perpendicular, in other implementations, other angles may be used. For example, the second side 126 may be angled relative to the first side 124 such that the second side 126 is positioned against or adjacent to a side surface of the housing of the wireless device 102. A third side 128 of the conductive member 112 extends from a second end of the first side 124, in the same direction as the second side 126, at an angle relative to the first side 124. For example, FIG. 3A depicts the third side 128 extending generally perpendicular to the first side 124, however in other implementations, other angles may be used. Additionally, while the second side 126 and the third side 128 are shown extending from the first side 124 at the same angle, in other implementations, the second side 126 and third side 128 may extend from the first side 124 at different angles, such as to accommodate the shape and placement of circuit boards 114, communication interfaces, housing surfaces, or other components of a wireless device 102.

The three-sided shape of the conductive member 112 may enable the conductive member 112 to be placed over and to at least partially enclose a portion of a circuit board 114 that includes a communication interface. For example, when the conductive member 112 is positioned within the housing of a wireless device 102, the first side 124 may be positioned over a communication interface, while the second side 126 and third side 128 extend toward the circuit board 114 and communication interface. While FIG. 3A depicts the conductive member 112 having a three-sided shape in which a bottom side opposite the first side 124, and the ends of the conductive member 112 (e.g., the edges of the first side 124 that are perpendicular to the second side 126 and third side 128) are open, however in other implementations, shapes having more than three sides may be used. Additionally, in other implementations, a conductive member 112 that includes only a single side or two sides may be used.

In some implementations, the conducive member 112 may include one or more engagement features 302, such as holes, slots, notches, and so forth that may accommodate portions of the housing, circuit board 114, or other components of a wireless device 102. For example, openings in the conductive member 112 may be positioned to enable connectors, buttons or other input devices, lights or other output devices, and so forth to be visible and able to be engaged. As another example, openings in the conductive member 112 may be used to engage the conductive member 112 with other portions of a wireless device 102, or to accommodate the shape of various internal components or housing surfaces of the wireless device 102.

The conductive member 112 includes a first plurality of slots 130(1) that extend through the second side 126 and a first portion of the first side 124, and a second plurality of slots 130(2) positioned opposite the first plurality of slots 130(1) that extend through the third side 128 and a second portion of the first side 124. Each of the slots 130 may have the same length, width, and spacing from adjacent slots 130 and may be positioned symmetrically about a long axis of the first side 124 of the conductive member 112, as shown in FIG. 3A. In other implementations, the slots 130 may have non-equal lengths, widths, or spacing, or may be positioned asymmetrically on the conductive member 112. As described previously, the length of the slots 130 is selected to cause resonance of the conductive member 112 at a frequency associated with a communication interface to enable the conductive member 112 to attenuate signals associated with the frequency.

Figure 3B:
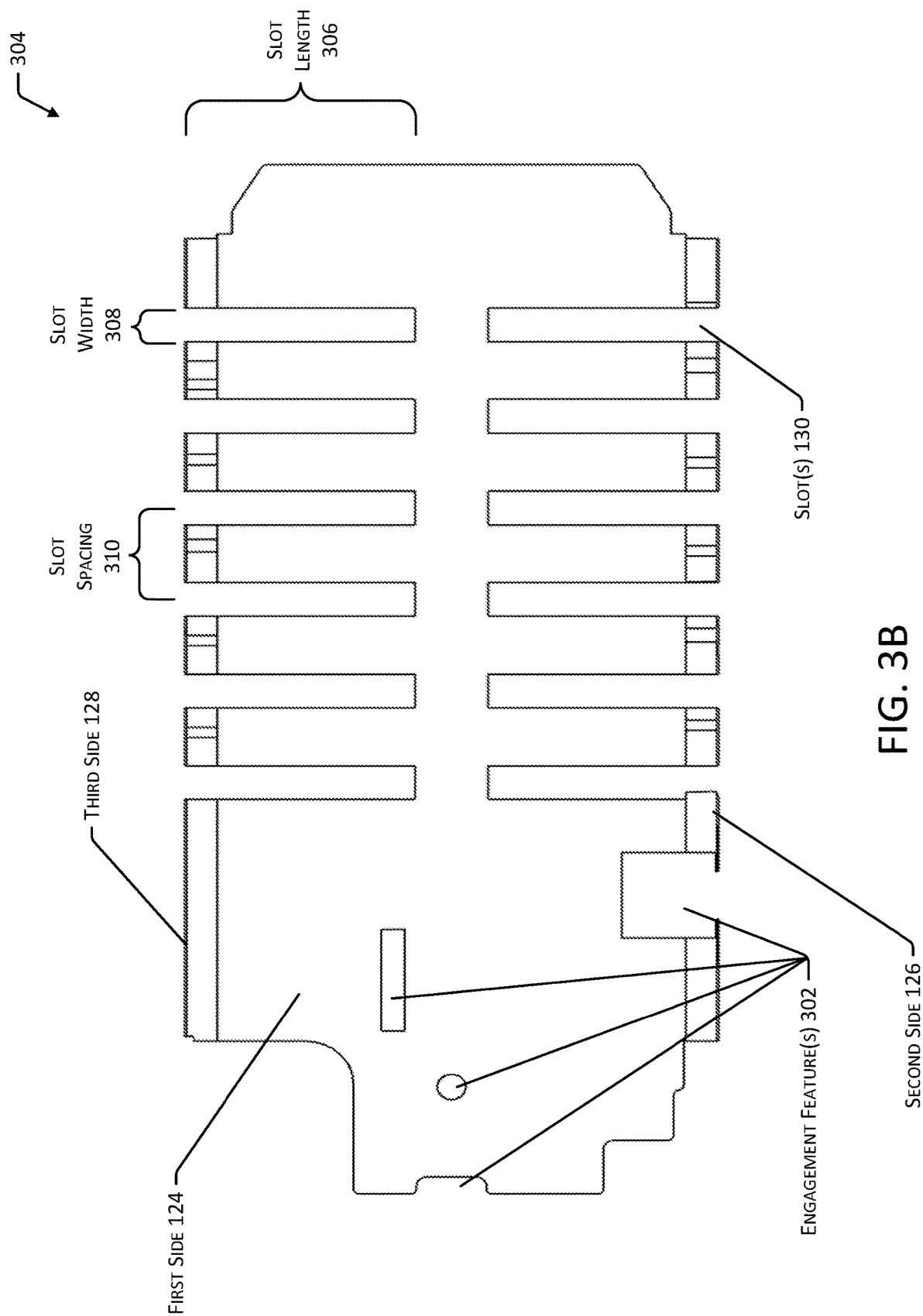
FIG. 3B is a diagram depicting a top view of the conductive member of FIG. 3A.

For example, FIG. 3B is a diagram 304 depicting a top view of the conductive member 112 of FIG. 3A. As shown in FIG. 3B, each slot 130 has a slot length 306 associated with resonance at a selected frequency band, such as a 2.4 GHz frequency band used by a Wi-Fi interface. Each slot 130 has a slot width 308 and a slot spacing 310 from adjacent slots 130 that may be selected based on the signal strength associated with a second communication interface 118 or an amount of attenuation expected to reduce interference from the second communication interface 118 sufficiently to enable communication using the first communication interface 116.

Figure 3C:
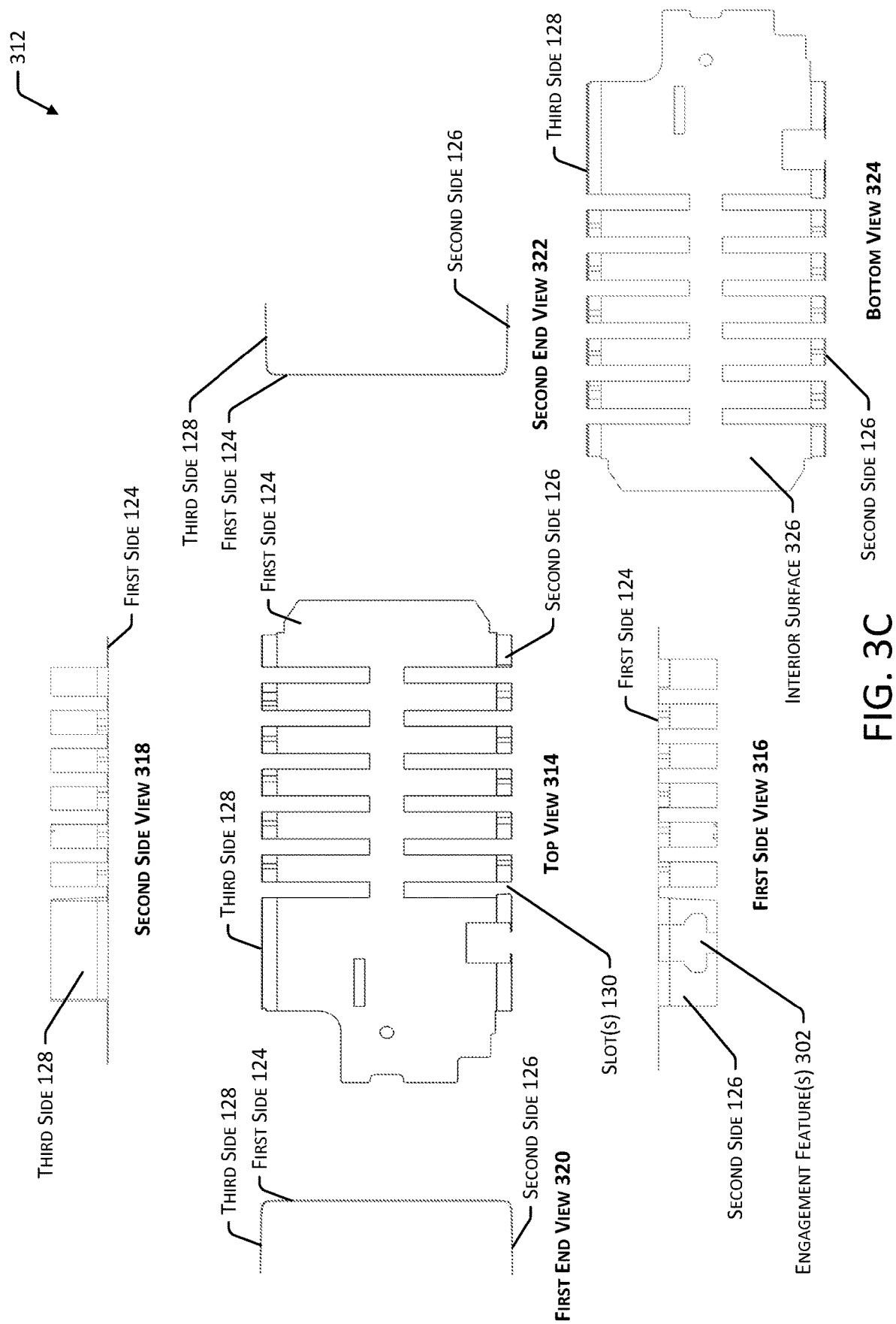
FIG. 3C is a series of diagrams depicting various views of the conductive member of FIG. 3A.

FIG. 3C is a series of diagrams 312 depicting various views of the conductive member 112 of FIG. 3A. A top view 314 is shown, illustrating the conductive member 112 from the first side 124, in which the slots 130 and various engagement features 302 are visible. A first side view 316 illustrates the conductive member 112 from the second side 126, in which a first portion of the slots 130 and an engagement feature 302 are formed. A second side view 318 illustrates the conductive member 112 from the third side 128, in which a second portion of the slots 130 are formed. A first end view 320 illustrates the conductive member 112 from the end thereof that faces the first communication interface 116, as shown in FIG. 1B, showing the angled relationship between the first side 124, second side 126, and third side 128. A second end view 322 illustrates the conductive member 112 from the end thereof that faces the second communication interface 118, as shown in FIG. 1B. A bottom view 324 illustrates the underside of the conductive member 112 shown in the top view 314, such that the slots 130, engagement features 302, and an interior surface 326 of the first side 124 are visible.

Figure 4:
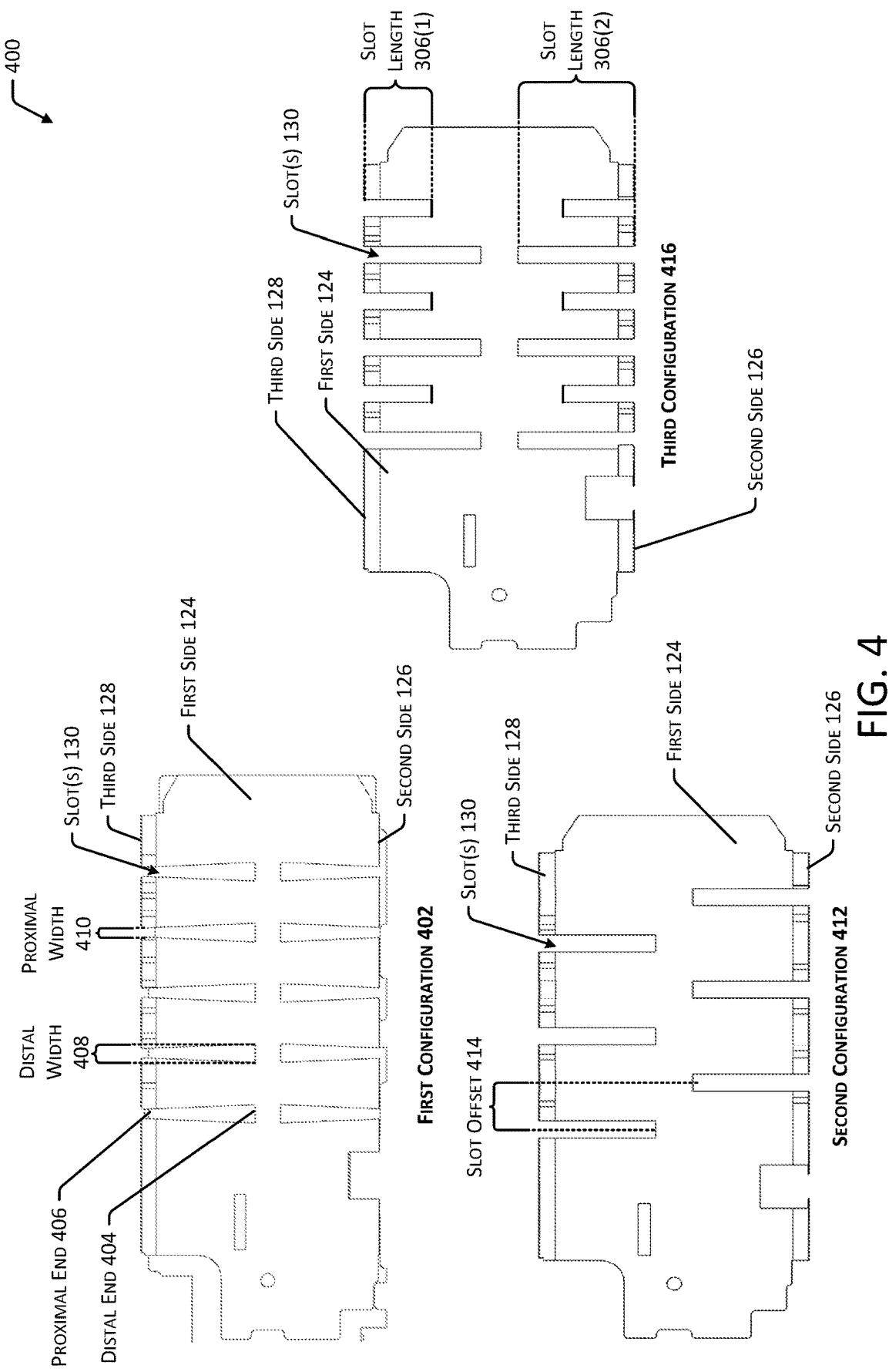
FIG. 4 is a series of diagrams depicting various configurations of conductive members within thin the present disclosure.

FIG. 4 is a series of diagrams 400 depicting various configurations of conductive members 112 within the present disclosure. FIGS. 1-3 depict an implementation of a conductive member 112 having rectangular slots 130, each with an equal slot length 306, and each symmetrically positioned opposite a corresponding slot 130 relative to the long axis of the first side 124 of the conductive member 112.

FIG. 4 illustrates a first configuration 402 in which the slots 130 have a trapezoidal shape. For example, each slot 130 includes a distal end 404 proximate to the center of the first side 124 and a proximal end 406 proximate to the intersection of the first side 124 and one of the second side 126 or third side 128. The distal width 408 of each slot 130 at the distal end 404 is greater than the proximal width 410 of each slot 130 at the proximal end 406, providing the slots 130 with a trapezoidal shape. The increased width of at least a portion of the slots 130 relative to rectangular-shaped slots 130 may enable the first configuration 402 shown in FIG. 4 to attenuate a larger bandwidth of emitted signals 202 that pass through the conductive member 112.

FIG. 4 illustrates a second configuration 412 in which the slots 130 formed in the conductive member 112 are not symmetrically arranged about the long axis of the first side 124. Specifically, in the second configuration 412, the slots 130 are formed in a staggered or off-set arrangement in which each slot 130 in the second side 126 is spaced a slot offset 414 distance along the length of the conductive member 112 relative to an adjacent slot 130 in the third side 128.

FIG. 4 also illustrates a third configuration 416 in which the slots 130 formed in the conductive member 112 may have multiple slot lengths 306. For example, a length of the slots 130 may be selected to cause resonance of the conductive member 112 at a selected frequency band associated with a communication interface, such as a 2.4 GHz frequency band used by a Wi-Fi interface. In some cases, the length of the slots 130 may be selected to cause resonance at multiple frequencies, such as to reduce interference to a Wi-Fi interface capable of operating at two frequencies (e.g., 2.4 GHz and 5.0 GHz). The third configuration 416 is shown including one or more slots 130 having a first slot length 306(1), and one or more slots 130 having a second slot length 306(2) that is greater than the first slot length 306(1), which may enable resonance of the conductive member 112 at multiple frequencies.

Those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
   a housing;
   a circuit board within the housing;
   a Wi-Fi interface within the housing and mounted proximate to a first end of the circuit board, wherein the Wi-Fi interface operates within a first frequency band;
   a High-Definition Multimedia Interface (HDMI) interface mounted proximate to a second end of the circuit board opposite the first end, wherein the HDMI interface radiates within the first frequency band; and
   a conductive member positioned within the housing, proximate to a portion of the circuit board that is between the Wi-Fi interface and the HDMI interface, wherein the conductive member comprises a plurality of slots, each slot of the plurality of slots having a length associated with resonance within the first frequency band, and wherein a number of slots in the plurality of slots and a spacing between adjacent slots of the plurality of slots attenuates signals in the first frequency band associated with operation of the HDMI interface that are conducted across the conductive member to prevent interference to signals associated with the Wi-Fi interface by the signals associated with the HDMI interface.

2. The device of claim 1, further comprising a conductive foam within the housing between the conductive member and the portion of the circuit board, wherein the conductive foam provides an electrical pathway between the conductive member and a system ground associated with the circuit board.

3. The device of claim 1, wherein the conductive member comprises:
   a first side positioned between the circuit board and a first portion of the housing, wherein the first side has a first end and a second end opposite the first end;
   a second side extending from the first end of the first side toward the circuit board at a first angle; and
   a third side extending from the second end of the first side toward the circuit board at a second angle;
   wherein each slot of the plurality of slots extends through a portion of the first side and one of the second side or the third side.

4. A device comprising:
   a first communication interface comprising a transceiver for communication using one or more wireless networks;
   a second communication interface comprising a physical connector; and
   a conductive member positioned between the first communication interface and the second communication interface, wherein the conductive member includes a plurality of slots, each slot of the plurality of slots having a length associated with resonance of a frequency associated with the first communication interface, and wherein the conductive member attenuates signals transmitted by the second communication interface that are associated with the frequency associated with the first communication interface.

5. The device of claim 4, wherein the conductive member is not electrically coupled to the first communication interface and the second communication interface.

6. The device of claim 4, further comprising:
   circuitry that is electrically connected to the first communication interface and the second communication interface; and
   a conductive foam between the circuitry and the conductive member, wherein the conductive foam provides an electrical pathway between the conductive member and a system ground associated with the circuitry.

7. The device of claim 4, wherein one or more of a number of slots in the plurality of slots or a spacing between adjacent slots of the plurality of slots corresponds to a strength associated with the signals transmitted by the second communication interface.

8. The device of claim 4, wherein at least one slot of the plurality of slots comprises:
a first end having a first width; and
a second end having a second width;
wherein the second width is greater than the first width.

9. The device of claim 4, wherein each slot of the plurality of slots comprises a rectangular shape.

10. The device of claim 4, further comprising a housing, wherein the first communication interface, the second communication interface, and the conductive member are within the housing, and wherein the conductive member is secured to an interior surface of the housing.

11. The device of claim 4, further comprising:
a circuit board between the first communication interface and the second communication interface; and
a housing, wherein the first communication interface, the second communication interface, the conductive member, and the circuit board are within the housing, wherein the conductive member is positioned between the circuit board and a side of the housing, and wherein the conductive member is secured to an interior surface of the side of the housing.

12. The device of claim 4, further comprising:
a circuit board between the first communication interface and the second communication interface; and
a housing, wherein the first communication interface, the second communication interface, the circuit board, and the conductive member are within the housing;
wherein the conductive member comprises:
a first side positioned between the circuit board and an inner surface of the housing, wherein the first side has a first end and a second end opposite the first end;
a second side extending from the first end toward the circuit board at a first angle; and
a third side extending from the second end toward the circuit board at a second angle;
wherein at least one slot of the plurality of slots extends through a portion of the first side and one of the second side or the third side.

13. A device comprising:
a first communication interface;
a second communication interface comprising a physical connector; and
a conductive member positioned between the first communication interface and the second communication interface, wherein the conductive member comprises:
a first side with a first end and a second end opposite the first end;
a first plurality of slots extending through a first portion of the first side; and
a second plurality of slots extending through a second portion of the first side.

14. The device of claim 13, wherein the conductive member further comprises:
a second side extending from the first end in a first direction at a first angle, wherein at least one slot of the first plurality of slots further extends through the second side; and
a third side extending from the second end in the first direction at a second angle, wherein at least one slot of the second plurality of slots further extends through the third side.

15. The device of claim 13, wherein at least one slot of the first plurality of slots comprises:
a first end of the at least one slot having a first width; and
a second end of the at least one slot having a second width, wherein the second width is greater than the first width.

16. The device of claim 13, wherein:
at least one slot of the first plurality of slots is positioned at a first location along a length of the first side; and
at least one slot of the second plurality of slots is positioned at a second location along the length of the first side that differs from the first location.

17. The device of claim 13, wherein:
at least one first slot of the first plurality of slots has a first length; and
at least one second slot of the first plurality of slots or the second plurality of slots has a second length greater than the first length.

18. The device of claim 13,
wherein a length of at least one slot of the first plurality of slots is associated with resonance of a frequency associated with the first communication interface, and wherein the conductive member attenuates signals transmitted by the second communication interface that are associated with the frequency associated with the first communication interface.

19. The device of claim 18, wherein one or more of a number of slots in the first plurality of slots or a spacing between adjacent slots of the first plurality of slots corresponds to a strength associated with the signals transmitted by the second communication interface.

20. The device of claim 18, further comprising:
a circuit board between the first communication interface and the second communication interface; and
a housing, wherein the first communication interface, the second communication interface, the conductive member, and the circuit board are within the housing;
wherein the first side of the conductive member is positioned between the circuit board and an inner surface of the housing, and wherein the conductive member further comprises:
a second side extending from a first end of the first side toward the circuit board; and
a third side extending from a second end of the first side toward the circuit board.

* * * * *